US010897710B2

(12) United States Patent
Levesque et al.

(10) Patent No.: US 10,897,710 B2
(45) Date of Patent: Jan. 19, 2021

(54) DISJOINT SECURITY IN WIRELESS NETWORKS WITH MULTIPLE MANAGERS OR ACCESS POINTS

(71) Applicant: Analog Devices International Unlimited Company, Limerick (IE)

(72) Inventors: Alain Pierre Levesque, Alameda, CA (US); Aleksandr Lushin, Santa Clara, CA (US); David Ramsay Hanson Bacher, Contra Costa, CA (US); Lance Robert Doherty, Alameda, CA (US)

(73) Assignee: Analog Devices International Unlimited Company, Limerick (IE)

( * ) Notice: Subject to any disclaimer, the term of this patent is extended or adjusted under 35 U.S.C. 154(b) by 337 days.

(21) Appl. No.: 15/963,055

(22) Filed: Apr. 25, 2018

(65) Prior Publication Data

US 2018/0317089 A1 Nov. 1, 2018

Related U.S. Application Data

(60) Provisional application No. 62/492,640, filed on May 1, 2017.

(51) Int. Cl.
*H04L 9/00* (2006.01)
*H04W 12/06* (2009.01)
(Continued)

(52) U.S. Cl.
CPC ............ *H04W 12/06* (2013.01); *H04L 9/083* (2013.01); *H04L 9/0819* (2013.01);
(Continued)

(58) Field of Classification Search
CPC ............ H04W 12/06; H04W 12/0401; H04W 12/0609; H04W 12/10; H04W 12/22; H04L 9/083; H04L 9/0819
See application file for complete search history.

(56) References Cited

U.S. PATENT DOCUMENTS 7,596,368 B2   9/2009   Yamada et al.
7,804,807 B2   9/2010   Korus et al.
(Continued)

FOREIGN PATENT DOCUMENTS

CN   101610533 A   12/2009
CN   104283774 A    1/2015
(Continued)

OTHER PUBLICATIONS

"Japanese Application Serial No. 2018-086733, Notification of Reasons for Rejection dated Mar. 25, 2019", w/ English Translation, 8 pgs.
(Continued)

*Primary Examiner* — Beemnet W Dada
(74) *Attorney, Agent, or Firm* — Schwegman Lundberg & Woessner, P.A.

(57) ABSTRACT

In a wireless mesh network having multiple network managers, the network managers maintain network security through the use of encryption keys and packet counters. To ensure that each network manager can authenticate communications with any node of the network, the authentication data is replicated in a disjoint manner in all network managers. Advantageously, network reliability is assured by providing redundant managers that can seamlessly maintain network operation even if multiple network managers fail; newly joining managers can obtain full authentication data for the network upon joining; and network throughput is increased by ensuring that any of the multiple managers can authenticate the communications of any network node. The disjoint replication of the authentication data across all network managers is performed with low data-rate manager-to-manager packets propagated through the network. The disjoint security methods and systems can advantageously be used in wireless battery monitoring systems, for example.

23 Claims, 8 Drawing Sheets

(51) Int. Cl.
*H04W 8/30* (2009.01)
*H04L 9/08* (2006.01)
*H04L 29/08* (2006.01)
*H04W 12/04* (2009.01)
*H04W 84/18* (2009.01)
*H04W 12/08* (2009.01)
*H04W 12/00* (2009.01)
*H04L 29/06* (2006.01)

(52) U.S. Cl.
CPC ........... *H04L 67/1095* (2013.01); *H04W 8/30* (2013.01); *H04W 12/0401* (2019.01); *H04W 12/0609* (2019.01); *H04L 63/0209* (2013.01); *H04L 67/1046* (2013.01); *H04L 67/1089* (2013.01); *H04L 2209/601* (2013.01); *H04L 2209/80* (2013.01); *H04W 12/001* (2019.01); *H04W 12/0806* (2019.01); *H04W 84/18* (2013.01)

(56) References Cited

U.S. PATENT DOCUMENTS

| | | | |
|---|---|---|---|
| 8,037,305 | B2 | 10/2011 | Rahman et al. |
| 8,102,814 | B2 | 1/2012 | Rahman et al. |
| 8,155,007 | B2 | 4/2012 | Thubert et al. |
| 8,191,144 | B2 | 5/2012 | Cam Winget et al. |
| 8,208,635 | B2* | 6/2012 | Karschnia ............. H04W 12/04 380/270 |
| 8,266,433 | B1 | 9/2012 | Przykucki et al. |
| 8,983,066 | B2 | 3/2015 | Kruys et al. |
| 9,161,239 | B2 | 10/2015 | Mercier |
| 9,374,344 | B1 | 6/2016 | Takahashi |
| 9,379,972 | B2* | 6/2016 | Enns ....................... H04L 67/12 |
| 9,654,991 | B2 | 5/2017 | Yang et al. |
| 9,763,088 | B2 | 9/2017 | Lin |
| 2003/0061516 | A1 | 3/2003 | Yamaguchi et al. |
| 2005/0080887 | A1 | 4/2005 | Lee et al. |
| 2006/0198382 | A1 | 9/2006 | Sagara et al. |
| 2008/0080365 | A1 | 4/2008 | Weeresinghe |
| 2009/0054033 | A1* | 2/2009 | Pratt, Jr. ........... H04W 56/0015 455/410 |
| 2016/0323815 | A1 | 11/2016 | Kalika et al. |
| 2017/0055236 | A1 | 2/2017 | Levesque et al. |
| 2017/0063828 | A1* | 3/2017 | Zhou ....................... H04L 63/062 |

FOREIGN PATENT DOCUMENTS

| | | |
|---|---|---|
| CN | 105847037 A | 8/2016 |
| CN | 107438981 A | 12/2017 |
| CN | 108810887 | 11/2018 |
| DE | 102018003539 | 11/2018 |
| JP | 2003110576 | 4/2003 |
| JP | 2006246311 | 9/2006 |
| JP | 2009527144 | 7/2009 |
| JP | 2013191284 A | 11/2018 |
| WO | 2007094989 | 8/2007 |
| WO | WO-2015069041 A1 | 5/2015 |
| WO | WO-2016176408 A1 | 11/2016 |

OTHER PUBLICATIONS

"Chinses Application Serial No. 201810410853.0, Office Action dated Oct. 10, 2020", w/English Translation, 24 pgs.

* cited by examiner

DISJOINT SECURITY IN WIRELESS NETWORKS WITH MULTIPLE MANAGERS OR ACCESS POINTS

CROSS-REFERENCE TO RELATED APPLICATION

This application claims the benefit of U.S. Provisional Application No. 62/492,640, filed May 1, 2017, the disclosure of which is incorporated by reference herein in its entirety.

TECHNICAL FIELD

The present subject matter relates to techniques and equipment for providing disjoint security and authentication in wireless mesh networks with multiple network managers or access points.

BACKGROUND

A wireless mesh network is a network in which a plurality of wireless network nodes are configured for communication with each other across a mesh of wireless links. In general, a wireless mesh network has a single access point and an associated network manager that provides an interface between the wireless mesh network and elements outside of the mesh network (e.g., an external network, external applications, etc.).

Because the wireless mesh network generally only has a single access point and network manager, the throughput and reliability of the network are limited to the throughput and reliability of the access point and network manager. As such, the amount of data that can be provided to or received from the network may be limited by the throughput of those devices. Moreover, if either the access point or the network manager fails, the ability of communicating with the wireless network is lost.

SUMMARY

The teachings herein alleviate the above noted problems by providing increased throughput and improved reliability in wireless mesh networks and enabling use of multiple network managers configured to provide disjoint security across network managers. As a result, if one network manager fails, another network manager can seamlessly maintain operation of the wireless network based on pre-established authentication data used to maintain network security which is stored in each of the network managers.

In a wireless mesh network having multiple network managers, the network managers maintain network security through the use of encryption keys and packet counters. To ensure that each network manager can authenticate communications with any node of the network, the authentication data is replicated in a disjoint manner in all network managers. Advantageously, network reliability is assured by providing redundant managers that can seamlessly maintain network operation even if multiple network managers fail; newly joining managers can obtain full authentication data for the network upon joining; and network throughput is increased by ensuring that any of the multiple managers can authenticate the communications of any network node. The disjoint replication of the authentication data across all network managers is performed with low data-rate manager-to-manager packets propagated through the network. The disjoint security methods and systems can advantageously be used in wireless battery monitoring systems, for example.

In one illustrative embodiment, a method for coordinating authentication between network manager devices may include receiving, in a first network manager device, from a wireless network node via a first wireless mesh network access point of the wireless mesh network, a join request to join the wireless network node with the wireless mesh network. In response to receiving the join request, authentication data may be generated to authenticate subsequent communications passing through the first network manager device between the joined wireless network node and a host application external to the wireless mesh network. The authentication data may be stored at the first network manager device. Additionally, the first network manager device may transmit the authentication data to a second network manager device of the wireless mesh network for storage and use by the second network manager device to authenticate subsequent communications passing through the second network manager device and between the joined wireless network node and the host application.

In another illustrative embodiment, a network manager device may include a communication interface, a processor, and a non-transitory memory device. The communication interface may be configured to establish a communication link, via a first wireless mesh network access point, with a wireless mesh network. The processor may be communicatively connected to the communication interface. The non-transitory memory device may store program instructions which, when executed by the processor, cause the network manager device to receive, from a wireless network node via the first wireless mesh network access point, a join request to join the wireless network node with the wireless mesh network; generate, in response to receiving the join request, authentication data to authenticate subsequent communications passing through the network manager device between the joined wireless network node and a host application external to the wireless mesh network; store the authentication data at the network manager device; and transmit the authentication data to another network manager device of the wireless mesh network for storage and use by the other network manager device to authenticate subsequent communications passing through the other network manager device and between the joined wireless network node and the host application.

In a further illustrative embodiment, a wireless mesh network system may include a first network manager device configured to coordinate authentication with a second network manager device of the wireless mesh network system. The wireless mesh network system may further include a plurality of wireless network nodes in wireless communication with each other to form a wireless mesh network, a first wireless access point configured to provide a communication link between the first network manager and the plurality of wireless network nodes, and the first network manager device associated with the first wireless access point and configured to relay communications between the plurality of wireless network nodes and a host application executed by a host device external to the wireless network nodes. The first network manager device may be configured to generate an encryption key associated with a respective node of the plurality of wireless network nodes, and transmit a decryption key associated with the respective node to the second network manager device for decrypting communications from the respective node to the host device. Each respective node of the plurality of wireless network nodes may be configured to transmit encrypted packets to the host device based on the encryption key associated with the respective node, the encrypted packets being routed to the host device executing the host application through one of the first wireless access point of the first network manager device and a second wireless access point of the second network manager device and decrypted by the one of the first and second wireless access points based on the decryption key associated with the respective node.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
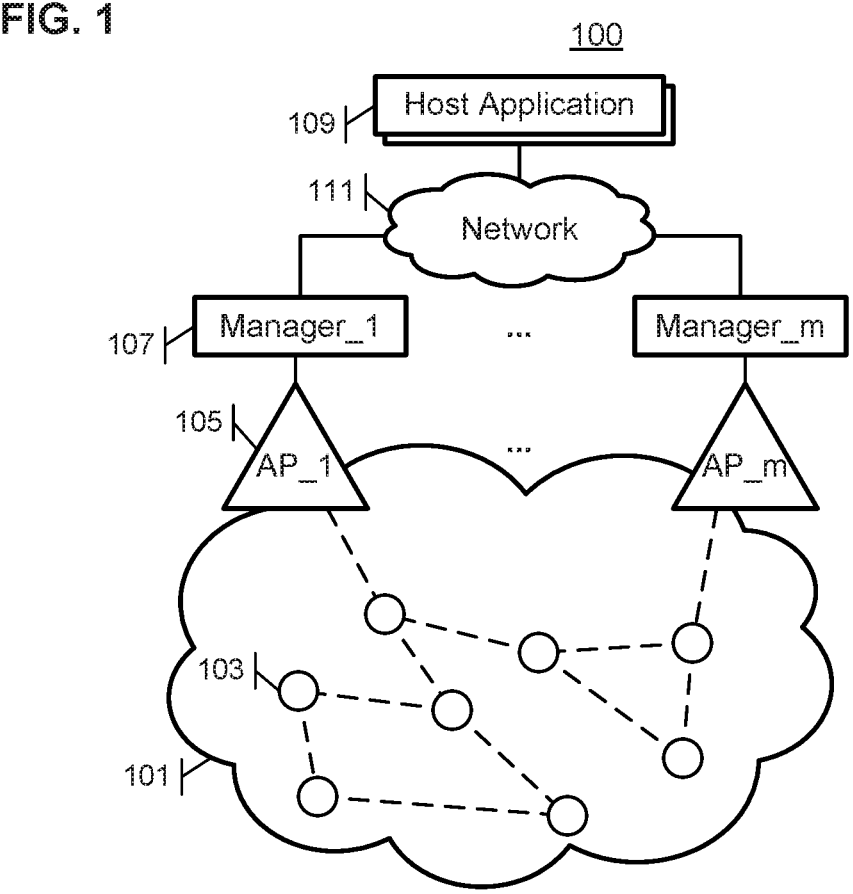
FIG. 1 is a high-level functional block diagram of a wireless mesh network system providing disjoint network security.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein provide increased throughput and improved reliability in wireless mesh networks by enabling use of multiple network managers, and providing disjoint security across network managers. As a result, if one network manager fails, another network manager can seamlessly maintain operation of the wireless network based on pre-established authentication data used to maintain network security which is stored in each of the network managers.

In general, in a wireless mesh network, the network manager provides an interface between the wireless mesh network and elements outside of the mesh network (e.g., an external network, external applications, etc.). The network manager can be implemented on a same physical device as an access point having a wireless transceiver for communicating with nodes of the wireless mesh network, or the network manager can be implemented on a separate device/processor in communication with the access point.

In addition to providing the interface between the wireless mesh network and the outside, the network manager also provides security to the network by authenticating devices (e.g., nodes and access points) communicating in the network. For this purpose, the network manager stores authentication data for each network node (e.g., an encryption or decryption key, and counters for counting packets sent to or received from the respective node).

In situations in which a wireless mesh network includes only a single manager, data throughput into or out of the network is generally limited to the throughput (or bandwidth) of the network manager and its associated access point (AP). Moreover, if the single network manager or its AP fails, connectivity into or out of the network is lost, and authentication data for the network may be lost.

Hence, to improve the reliability of the wireless mesh network, two or more access points and associated network managers can be provided. Furthermore, to ensure seamless function of the network through any of the managers, the network managers exchange the authentication data for each network node across manager-to-manager communication links. In this way, each of the managers stores in memory the authentication data for each network node (e.g., the encryption or decryption key and the counter for counting packets sent to or received from the respective node), and can encrypt or decrypt communications to or from any node of the network.

In operation, upon one of the multiple managers generating an encryption or decryption key for a node being joined to the wireless mesh network, the one manager transmits the generated encryption or decryption key to the other manager for storage. Upon generating an encryption or decryption key for a node or receiving an encryption or decryption key for the node from the other manager, each manager resets counter(s) associated with the node. The counter(s) count values are periodically exchanged between the managers. In this way, both managers store the authentication data for all network nodes and the managers can thus perform authentication for all wireless mesh network nodes.

Additionally, if one manager resets itself or otherwise fails, the other manager can maintain connectivity to the network based on the same authentication data (e.g., encryption or decryption keys and counter data). Moreover, if the one manager returns to operation, the one manager can retrieve the authentication data from the other manager in order to seamlessly resume operation.

The multi-manager disjoint network security implementation described herein may be advantageously used in wireless mesh networks requiring high levels of reliability, such as wireless mesh networks used in wireless battery monitoring systems (WBMS). In a WBMS, the use of two (or more) embedded manager devices ensures high network reliability while maintaining strong network security through the sharing of authentication data between managers. Specifically, nodes of the WBMS may send upstream data at a rate around 10 packets per second, with the packets being randomly received by either manager's access point (AP) and passed to the respective manager. The managers may decrypt the packets before the packets are sent to a final destination such as a host application running outside of the embedded manager devices. The host application can also send packets to all nodes by sending the packet to either manager, and either or both managers subsequently broadcast the packets from their associated APs into the wireless network after having encrypted them.

Further features will be discussed in detail below in relation to the examples illustrated in the accompanying drawings.

FIG. 1 illustrates an example of a wireless mesh network system 100 providing disjoint network security. As shown, the wireless mesh network system 100 includes a wireless mesh network 101 that includes a plurality of wireless nodes 103 (e.g., sensor nodes, or motes) and one or more access points (APs) 105 that communicate wirelessly with each other across wireless communication links (illustratively shown in dashed lines). Each access point 105 has an associated wireless network manager 107 that forms part of a same physical device, or that communicates with the associated AP 105 through a communication link (e.g., a wired connection). As shown, the system 100 can include m APs 105 and corresponding network managers 107 (m is a positive integer, m≥1).

The APs 105 bridge between the wireless mesh network 101 on the one hand, and the network managers 107 and elements outside of the wireless mesh network 101 on the other. For example, the APs 105 can provide a bridge or gateway between the wireless mesh network 101 and host application(s) 109 accessible through a communication network 111 such as a wired communication network (e.g., the Internet) and/or a wireless network (e.g., a Wi-Fi network).

In operation, nodes 103 of the wireless mesh network 101 can generate and send "upstream" packets to any network manager 107 or external host application 109, and can receive and process "downstream" packets from any manager 107 or host application 109. The packets may contain data (e.g., sensor data from a sensor node, control data for an actuator node) and/or operational data for establishing or maintaining the network (e.g., a join packet used for joining a new node to the network).

Among other functions, the wireless network managers 107 are responsible for providing network security by authenticating nodes 103, APs 105, and other managers 107 joining or communicating across the network, and by enabling encryption of packets communicated across the network 101. For these purposes, the wireless network managers 107 maintain authentication data. The authentication data can include security keys (e.g., encryption and decryption keys) and counters (e.g., packet counters) used for encryption/decryption of packets and for authentication of devices in the wireless mesh network 101. Based on the authentication data, packets can thus be encrypted by any network manager 107 prior to being sent through the wireless mesh network 101, and can be decrypted by any network manager 107 upon receipt from the wireless mesh network 101. In this regard, each manager is preferably equally capable of applying network security protocols to decrypt/encrypt and authenticate the packets.

As described in further detail below, the network managers 107 maintain the authentication data in a disjoint manner such that any manager can maintain seamless operation of the network even if all other managers fail. In this way, the network managers 107 provide a high degree of redundancy, which may be of particular benefit in applications requiring high network reliability such as in wireless battery monitoring systems (WBMS). Moreover, a network manager 107 is able to reset and seamlessly resume its security duties in the wireless mesh network even if it has lost all of its state information by retrieving authentication data from one or more other network managers 107. Additionally, data throughput into and out of the wireless mesh network 101 may be increased through the use of multiple managers 107 and APs 105.

To maintain disjoint copies of the authentication data, the network managers 107 periodically share security counter information during regular network operation, and share node-specific keys (e.g., encryption/decryption keys) when nodes join or rejoin the network. Additionally, the network manages 107 are configured to restore all security information to a manager following a manager reset or manager failure, and/or to provide a newly joining network manager with all security information to configure the newly joined manager for full functionality. In some examples, the wireless mesh network system 100 is further configured to filter advertisements, links, and join request packets transmitted by joining nodes to route through them through a single selected network manager to preempt creation of duplicative authentication data.

The disjoint storage of the authentication data in the network managers 107 advantageously does not require use of a centralized database to store the authentication data and other security information while nonetheless providing improved reliability and throughput. Instead of using a centralized database, the approach keeps the authentication updated across the multiple (e.g., two or more) network manager devices. The authentication data and other security information is shared between network managers over paths with much lower bandwidth than the paths used to wirelessly collect data packets from the network nodes. For example, the authentication data can be shared across wireless paths (e.g., through the APs 105 and the wireless mesh network 101) or through wired paths (e.g., directly between the managers 107).

Figure 2A:
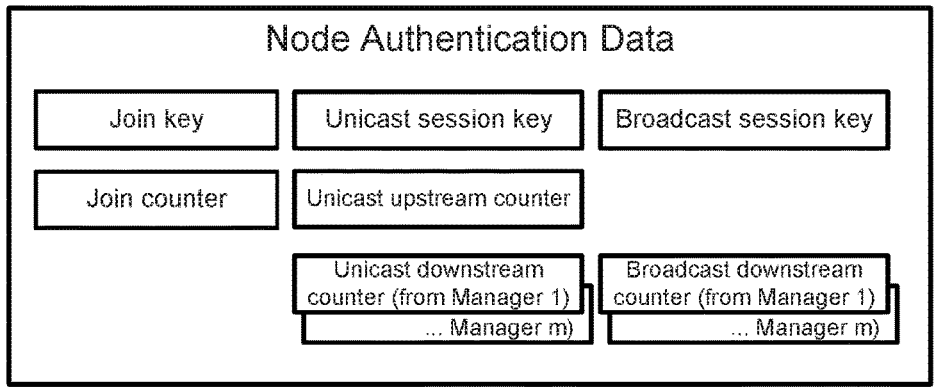
FIGS. 2A and 2B are block diagrams illustratively showing authentication data stored in nodes/access points (APs) and in network managers of a wireless mesh network system such as that shown in FIG. 1.
Figure 2B:
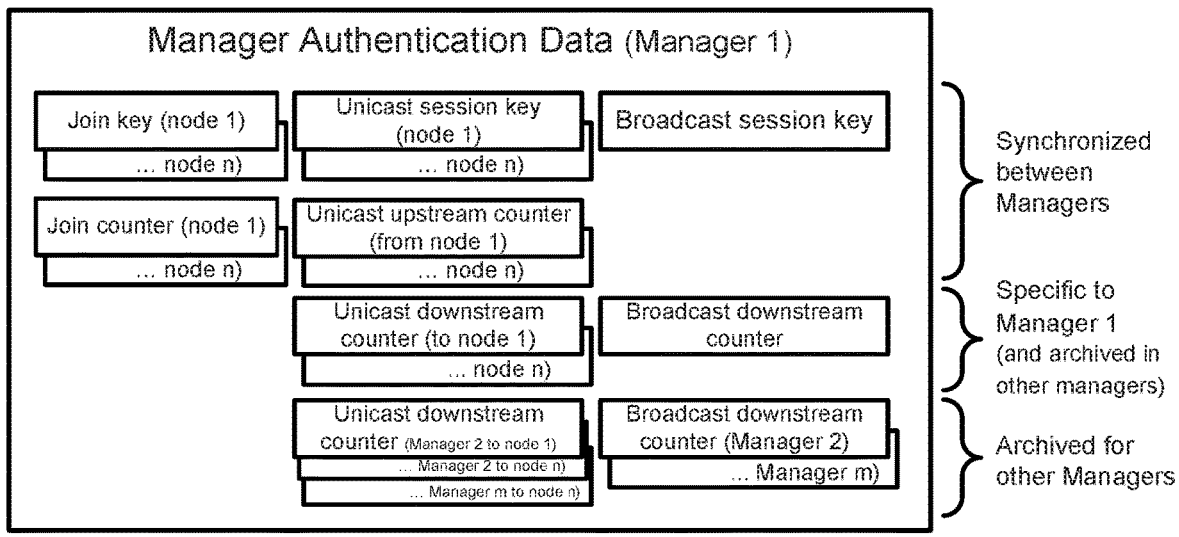

In order to perform authentication in the wireless mesh network 101, each network node 103 and each network manager 107 stores and makes use of authentication data including authentication keys (e.g., encryption and/or decryption keys) and packet counters. Examples of authentication that may be stored in each network node 103 or AP 105 and in each network manager 107 are shown in FIGS. 2A and 2B. More detailed description of the authentication data will also be provided below as part of the description of FIG. 3A.

Figure 3A:
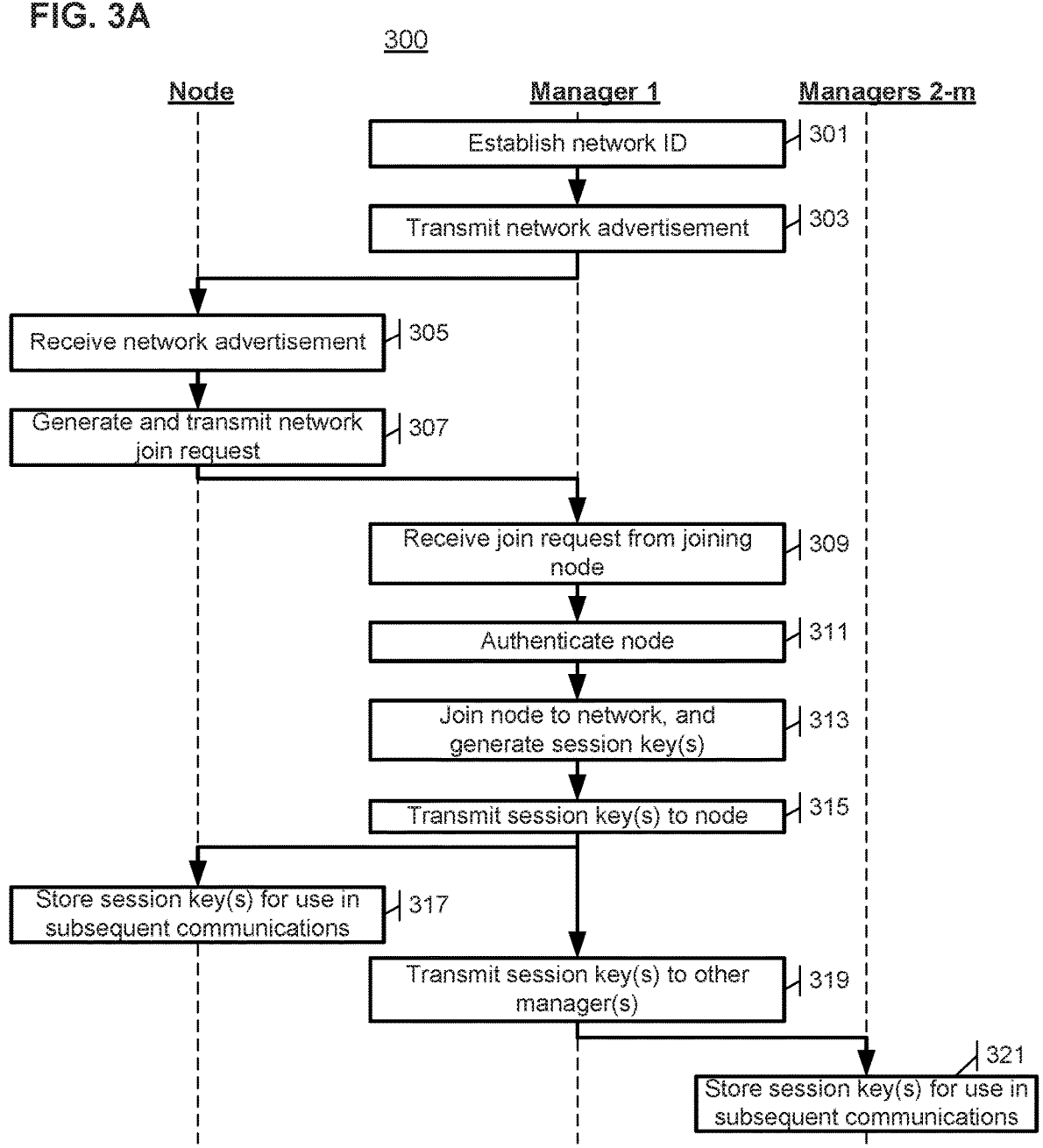
FIGS. 3A and 3B are flows chart showing an illustrative methods involved in joining a node or AP to a wireless mesh network such as that shown in FIG. 1.

FIG. 3A is a flow chart showing an illustrative method 300 for joining a node 103 to the wireless mesh network 101. The method 300 can also be used for joining an AP 105 to the network 101. The method includes steps for using and establishing authentication data, and further detailed information on the authentication data will be provided below as part of the description.

The method 300 for joining a node 103 to a wireless mesh network 101 begins in step 301 with a network manager 107 establishing a unique identifier Network ID for the network.

The manager 107 may additionally generate and store a broadcast session key (see FIG. 2B) that is used for encrypting broadcast packets transmitted to the network 101, and may initialize or reset a broadcast downstream counter (see FIG. 2B) for counting the number of packets broadcast from the manager 107 into the network 101. The manager 107 can further establish a preliminary schedule for the network, such as a schedule assigning combinations of timeslots and network communication channels (e.g., frequency bands) for different network nodes. The schedule will generally include at least one network joining time interval corresponding to a combination of a timeslot and channel during which network joining messages can be transmitted by nodes seeking to join the network.

In step 303, the network manager 107 transmits a network advertisement through its associated access point (AP) 105. The network advertisement generally includes the Network ID for the network as well as timing information to enable nodes seeking to join the network to synchronize to a network time reference. The network advertisement is transmitted through the network manager's AP 105, and is relayed by any nodes 103 already joined to the network.

The network joining process may be initiated in a network node 103 when the network node 103 is located within the communication range of the AP 105 or of another network node already joined to the network. In such a situation, the network node 103 can receive the network advertisement from the AP or from the other network node in step 305. In response to receiving the network advertisement, the network node 103 can synchronize itself to the network time reference of the network and can generate a network join request in step 307. The network join request typically includes identification of the network node 103, and is transmitted during the network joining time interval and on a network joining channel determined by the node 103 based on the received network advertisement.

As shown in FIG. 2A, each network node 103 can store a join key and a join counter used to provide security during the network joining process. In such situations, the network node 103 may increment the join counter upon generating the network join request, and may include the incremented count of the join counter in the network join request. Additionally, the network node 103 may encrypt at least a portion of the network join request using the join key.

The network join request transmitted by the network node 103 in step 307 propagates through the wireless mesh network 101 until it reaches the AP 105 and network manager 107. The network manager 107 receives the network join request through its AP 105 in step 309 and proceeds to authenticate the node in step 311.

As shown in FIG. 2B, each network manager 107 can store a join key and a join counter for each of the wireless network nodes 103 that are expected to join the network 101. For example, a network manager 107 may be configured for connection to n different nodes (n is a positive integer, n≥1), and may store a join decryption key for each of the n different nodes. Alternatively, the network manager 107 may store an algorithm that can be used to determine a decryption key for each of the n different nodes, for example based on a unique identifier for each node that is included in the network join request. The network manager 107 can further store a join counter for each node, and may increment the join counter for each received network join request received from the corresponding network node 103.

As part of the authentication of the network node 103 seeking to join the wireless network, the network manager 107 may retrieve from the received join request an identifier for the node 103. The network manager 107 may then decrypt the received join request message using the join key associated with the node 103. The network manager 107 further compares the current count of the join counter for the node 103 with the count included in the join request message. The manager then rejects the join request if the received join count is equal to or lower than one previously seen, or is equal to or lower than the join counter's count stored/maintained in the network manager 107. If the authentication of the joining network node 103 is successful, operation proceeds to step 313.

In step 313, the network manager 107 joins the node 103 to the network. Part of the joining process can include determining a new network schedule in which combinations of timeslots and network communication channels (e.g., frequency bands) are assigned for communications to and from the joining network node 103. In step 313, the network manager 107 further generates and stores authentication data for the joined node 103. The authentication data can include a set of session keys (e.g., unicast session key for the joined node 103) to be used for all subsequent communication with the joined node 103. The network manager 107 further initiates (or resets) counters used for all subsequent communications with the joined node 103 (e.g., unicast upstream counter and unicast downstream counter for the joined node 103).

The counters can be used to prevent replay attacks. For example, a first counter in a joined node 103 can be incremented every time a packet is transmitted to the network manager 107, and a corresponding second counter in the network manager 107 can be incremented every time a packet is received from a joined node 103. Additionally, the joined node 103 can include a current count value of the first counter in each packet transmitted to the network manager 107. In this case, upon receiving the packet in the network managers 107, the network manager 107 compares the count value included in the received packet with a current count value of the second counter associated with the joined node 103, and proceeds with authentication if the two count values are synchronized. However, if the two count values are not synchronized, the network manager 107 may determine that the packet was not transmitted by the joined node and can block the packet.

During normal operation network operation, the network manager 107 and the network nodes 103 may communicate using two different packet types. Unicast packets, which are used in unicast communication sessions, are transmitted by a sender (e.g., a network manager 107 or network node 103) to a single receiver (e.g., another network manager 107 or network node 103). In contrast, broadcast packets, which are used in broadcast communication sessions, are transmitted by a sender (e.g., a network manager 107 or network node 103) to all other devices in the network (e.g., all other network manager(s) 107 and network node(s) 103). The unicast and broadcast communication sessions may use different authentication data.

For example, a unicast session uses the unicast session key that is associated with a particular node and encrypts packets to be communicated between the particular node and the manager. There are two counters for this session: a unicast downstream counter that keeps track of the number of packets that have been sent from the manager to the particular node, and a unicast upstream counter that keeps track of the number of packets that have been sent from the particular node to any manager of the network. Hence, as shown in FIG. 2B, for each node in the network, the manager has a unique unicast session key and keeps two counters: a unicast upstream counter and a unicast downstream counter. Since the sessions are symmetric, the corresponding node will mirror each relevant key and counter, as shown in FIG. 2A.

In contrast, the broadcast session is used to flood packets from a network manager 107 to all nodes 103 in the wireless mesh network 101. All nodes 103 and APs 105 in the wireless mesh network 101 share the same broadcast session key, and maintain a broadcast downstream counter associated with each manager of the network, as shown in FIG. 2A. The broadcast session key may be generated by the network manager 107 upon establishing the wireless network (e.g., in step 301) or upon generating authentication data for a first network node 103 being joined to the network. Note that in general, no broadcast upstream counter is used in networks in which nodes are not configured to transmit broadcast packets.

Following the generation of the authentication data including the initialization of the counters, the network manager 107 proceeds in step 315 to transmit a join success packet to the joined network node 103. The join success packet is transmitted to the joined network node 103 through the AP 105 and the wireless mesh network 101. The join success packet typically includes authentication data for the joined network node 103, including the unicast session key for the joined network node and the broadcast session key for the wireless mesh network 101. The join success packet can additionally include a current count of the broadcast downstream counter(s) stored by the network manager 107, and include the current network schedule.

In step 317, in response to receiving the join success packet via the AP 105 and the wireless mesh network 101, the joined network node 103 stores the received authentication data. The joined network node 103 may further initialize and/or reset its packet counters including the unicast upstream counter, the unicast downstream counter associated with the network manager having performed the joining process, and any unicast downstream counters associated with any other network manager of the network.

Additionally, in step 319, the network manager 107 transmits to all other network manager(s) 107 that are currently joined to the network the authentication data for the joined network node 103, including the unicast session key for the joined network node. In step 321, each of the other network managers stores the received authentication data for the joined network node 103, including the unicast session key for the joined network node. In step 321, each of the other network managers may further initialize and/or reset its packet counters for the joined network node, including the unicast upstream counter and the unicast downstream counter associated with the joined network node.

In further operation of the wireless mesh network 101, network nodes 103 exchange packets with the network manager(s) 107 and vice versa. In order for the nodes 103 and manager(s) 107 to securely exchange packets, they make use of two pieces of authentication data shared amongst themselves. First, they make use of the shared secret keys, which typically are 16 bytes long in illustrative networks. Second, they make use of the security counters which are incremented with each transmitted/received message and are used to prevent replay attacks. These authentication data are to prevent other devices that do not form part of the wireless mesh network 101 from understanding an intercepted packet/message, and/or from transmitting a packet/message fraudulently identifying itself as being from a device joined to the network 101. For example, security counters in a network manager 107 and in a node 103 may be incremented each time a packet is transmitted from the network manager 107 to the node 103 so that the counters remain synchronized. Additionally, each packet transmitted from the network manager 107 to the node 103 may include a current count value of the counter maintained by the network manager 107. In this way, the node can compare the count value included in the received packet with the count value of the counter maintained by the node 103 and, if the count values do not correspond, the node can block the packet. This enables the node to block packets from devices fraudulently identifying themselves as the network manager 107.

Figure 3B:
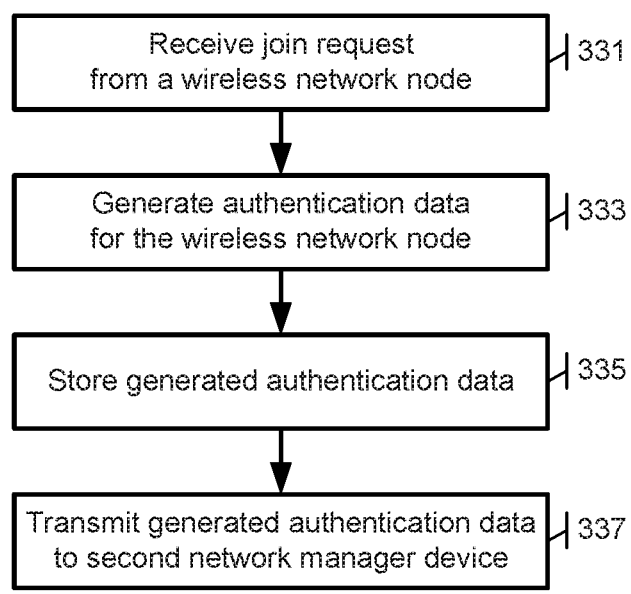

From the perspective of the network manager 107, and as shown in the method 330 of FIG. 3B, a network manager 107 can thus coordinate authentication with other network manager devices by performing a step 331 to receive, from a wireless network node 103 via a first wireless mesh network access point 105 of a wireless mesh network 101, a join request to join the wireless network node 103 with the wireless mesh network 101. In step 333, the network manager 107 may, in response to receiving the join request, generate authentication data to authenticate subsequent communications passing through the network manager device between the joined wireless network node and a host application external to the wireless mesh network. In step 335, the network manager 107 stores the generated authentication data and, in step 337, transmits the generated authentication data to another network manager device of the wireless mesh network 101 for storage and use by the other network manager device in authenticating subsequent communications passing through the other network manager device and between the joined wireless network node and the host application.

While the methods 300 and 330 have described processes for joining a network node 103 to the wireless mesh network 101, the methods can be identically applied for joining an access point (AP) 105 to the wireless mesh network 101. Furthermore, each AP may store node authentication data such as that shown in FIG. 2A. Once the AP 105 is joined to the network (e.g., following completion of step 317), the network manager 107 associated with the joined AP 105 can be joined to the network as described below in relation to FIG. 4.

Figure 4:
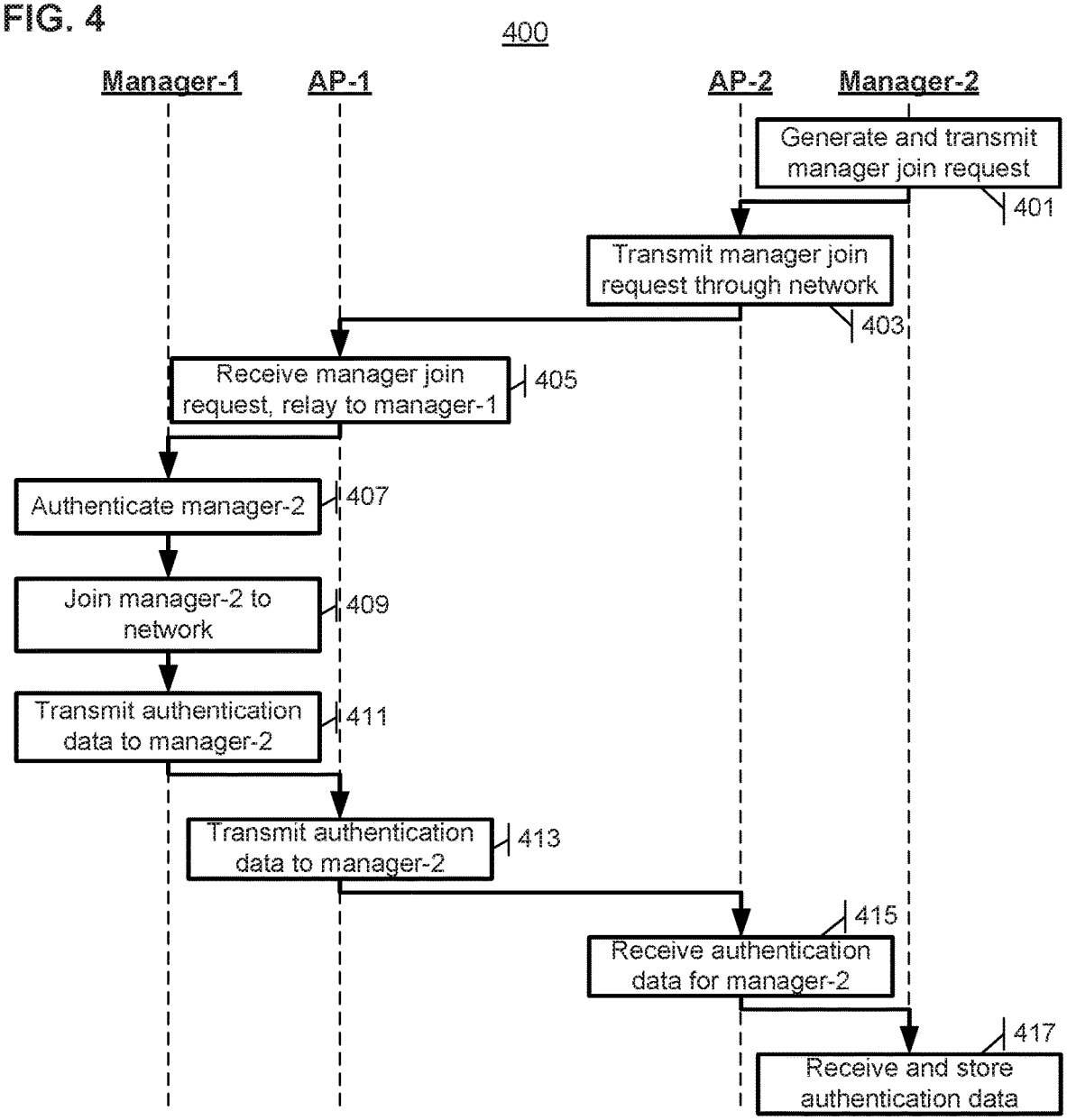
FIG. 4 is a flow chart showing an illustrative method for joining a network manager to a wireless mesh network such as that shown in FIG. 1.

FIG. 4 is a flow chart showing an illustrative method 400 for joining a network manager 107 to the wireless mesh network 101. For purposes of further description of the network manager joining process, the network manager 107 currently joined to the network 101 is referred to as manager-1 and its associated access point 105 as AP-1, while the network manager 107 seeking to join the network is referred to as manager-2 and its associated access point 105 as AP-2. While the description describes the function of only two managers, the wireless mesh network 101 of method 400 may include additional managers.

In step 401, manager-2 determines that AP-2 has been joined to the wireless mesh network 101 (e.g., following step 317 of method 300). Manager-2 proceeds to generate a manager join request message and to transmit the request to manager-1 through AP-2 and the wireless mesh network 101 (step 403). At least a portion of the manager join request can be encrypted using the unicast upstream session key stored by AP-2 in step 317, and the transmitted manager join request may include the current count of the unicast upstream counter maintained by AP-2. AP-1 receives the manager join request (step 405) through the wireless mesh network 101 and relays the received request to manager-1.

In response to receiving the manager join request, manager-1 authenticates manager-2 on the basis of the information included in the manager join request (step 407). The authentication may include decrypting any encrypted portion of the manager join request using the unicast session key stored by manager-1 and associated with AP-2, and confirming that any unicast upstream count included in the manager join request matches the unicast upstream counter for AP-2 that is maintained by manager-1. Specifically, if a unicast upstream count included in the manager join request does not match the unicast upstream counter for AP-2 that is maintained by manager-1 (e.g., if the two count values are not equal, if a difference between the count values exceeds a threshold (e.g., 5), if the count included manager joint request is less than that maintained by manager-1, or the like), the authentication of manager-2 may fail. Additional manager authentication steps may also be performed.

If the authentication of manager-2 is successful, the manager is joined to the wireless mesh network 101 in step 409. In turn, manager-1 transmits any needed authentication data to manager-2 in step 411. The authentication data is typically transmitted via the wireless mesh network 101 (as shown in steps 413 and 415), although in some cases it may be transmitted through a wired or other direct communication link between the network managers 107. The authentication data transmitted to manager-2 will typically include the broadcast session key; broadcast downstream counters for all network managers currently in the network; unicast session keys for all nodes; unicast upstream counters for all nodes; unicast downstream counters for all nodes and all network managers currently in the network; and join counters for all nodes. The authentication data can optionally include the join keys for all nodes, for example to provide synchronization and conflict resolution for the node-specific join keys that are pre-programmed into the managers and used to join any devices. In step 417, manager-2 receives and stores the authentication data for use in further network operation.

The method 400 may be undertaken to provide a new network manager 107 (e.g., a network manager 107 newly joining the wireless mesh network 101) with the authentication data stored by other managers in the network. The method 400 may also be undertaken following the reset of a manager (e.g., following a manager failure) in order to provide the reset manager with up-to-date authentication data for the wireless mesh network 101.

As described above, authentication data for the wireless mesh network 101 is shared with a newly joined network manager 107 upon the network manager 107 being joined to the network (see, e.g., method 400). In addition, node-specific authentication data for a newly joined node 103 is shared between all network managers 107 that have been joined to the wireless mesh network 101 following the node being joined to the network (see, e.g., steps 319-321 of method 300). Note that steps 319-321 of method 300 may be performed in response to the node being joined to the network, for example immediately following the node being joined to the network, at a time determined based on a time at which the node is joined to the network, or at a predetermined time (or periodically occurring time) following the node being joined to the network.

In addition to the two time frames over which authentication data (or security information) is exchanged between managers as detailed in the preceding paragraph, there is a third time frame over which authentication data for the wireless mesh network 101 is shared between network managers 107, as described below in relation to FIG. 5. The sharing described in relation to FIG. 5 may be performed in order to maintain synchronization between counters stored in the network managers 107 as the counters are incremented during operation of the network (e.g., incremented in response to packets being transmitted and received in the network). In these regards, there are three time frames over which security information changes.

Figure 5:
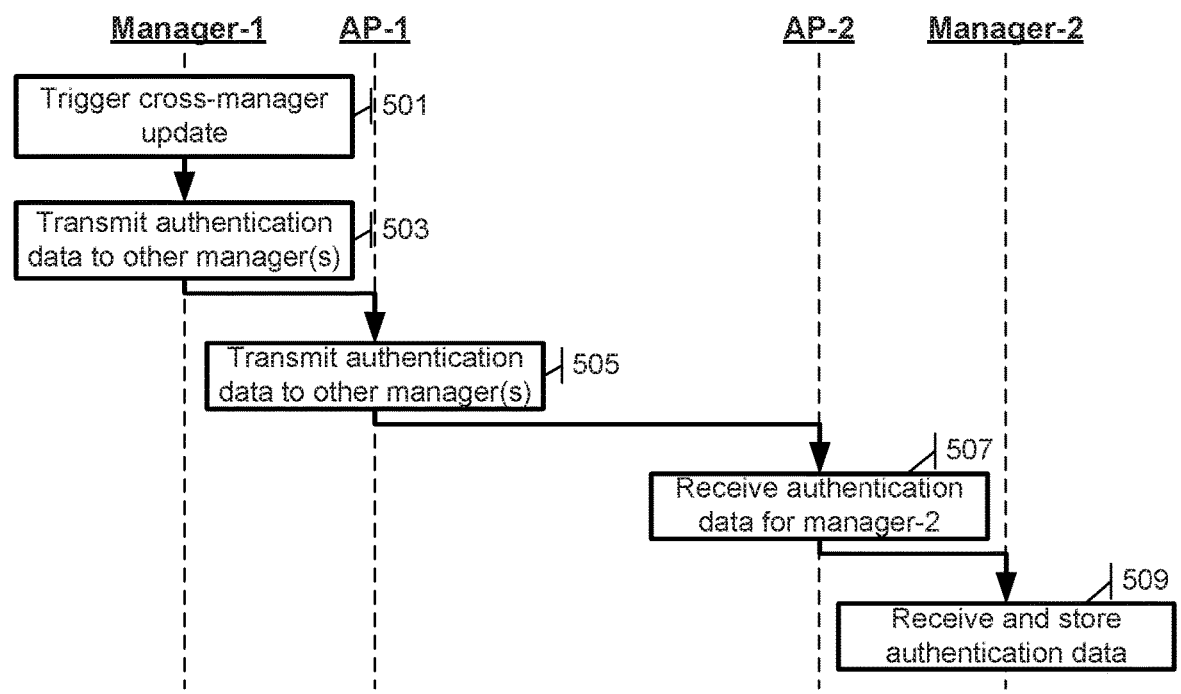
FIG. 5 is a flow chart showing an illustrative method for synchronizing authentication data between multiple network managers in a wireless mesh network such as that shown in FIG. 1.

FIG. 5 is a flow chart showing an illustrative method 500 for synchronizing authentication data between network managers 107 of a wireless mesh network 101. For purposes of description in FIG. 5, two network managers 107 are shown. However, any number of additional network managers may function in the same manner as manager-2 shown in FIG. 5.

Method 500 begins in step 501 with the triggering of a cross-manager update or synchronization of authentication data. The cross-manager synchronization may be triggered in manager-1 on a periodic basis. Alternatively or additionally, the cross-manager synchronization may be triggered in response to a request for synchronization received from another network manager (e.g., manager-2), and/or in response to determining that any one or more counter(s) in the network manager-1 has reached a threshold value. In response to triggering of a cross-manager update, manager-1 transmits selected authentication data to the other manager(s) of the wireless mesh network in step 503. The authentication data is typically transmitted to all other network managers 107, although in some cases the authentication data may be transmitted to only one or a selected number of the other network managers 107. The authentication data is typically transmitted through the wireless mesh network 101 (as shown in steps 505 and 507), although in some cases it may be transmitted through a wired or other direct communication link between the network managers 107.

The cross-manager update or synchronization can be used to synchronize all authentication data between the network managers. For example, all counter data and all key data (e.g., all authentication data shown in FIG. 2B) may be synchronized between the network managers 107. However, in general, synchronization of session key data between managers 107 is maintained through data exchanges occurring, for example, in steps 319-321 and 411-417, and session key data may therefore not need to be synchronized in step 503. In such situations, the cross-manager update or synchronization may thus be used to synchronize only the counter data maintained in the managers (e.g., all counter data shown in FIG. 2B) or a subset thereof. For example, the synchronization may include counter data for all counters stored by the manager-1. Alternatively, the synchronization may include counter data for one or more counters, such as for those counters having been incremented or reset since an earlier synchronization event. In step 509, manager-2 (and all other managers having received the cross-manager update data) receives and stores the authentication data for use in further network operation.

Through the synchronization of authentication data between multiple network managers 107 of a wireless mesh network 101, security protocols can be established and maintained in the network with the multiple managers sharing a relatively small amount of authentication data between them. The managers can share the authentication data (or other security information) in special manager-to-manager packets that flow wirelessly through the wireless mesh network 101 between the managers' respective APs 105. These manager-to-manager packets use the same security as other wireless packets in the network, such as encryption using a unicast session key associated with a transmitting/sending AP 105 and unicast counter verification.

As shown in FIG. 2B, all session keys are shared between the managers, as is the upstream unicast session counter for each network node 103. However, downstream counters may be different for each manager 107 to allow each manager to independently and asynchronously send packets to the network nodes 103 and ensure that the remaining manager(s) can continue to operate even if one network manager fails. Furthermore, in order to allow for full redundancy and manager recovery, each network manager 107 archives its local downstream counter information on the other manager(s) such that the archived count information can be retrieved following a manager failure.

In operation, in cases in which a wireless mesh network 101 has multiple network managers 107, one network manager 107 is generally selected (e.g., permanently or dynamically) to function as a master manager while the other manager(s) function as slave managers. The master manager, when starting the network (e.g., step 301), generates the broadcast session key, clears its downstream broadcast counter, and reads any known join counters from memory. In turn, there are various orders that the nodes, APs, and slave manager can boot up and join the wireless mesh network (using, e.g., the processes described in methods 300 and 400). In one example, a slave manager is the second device to join in the network 101. As part of joining the network, the slave manager clears its downstream broadcast counter, and receives the broadcast session key and known join counters through a manager-to-manager packet exchange (e.g., step 417). At this point, either manager is equipped to join any new nodes 103 to the network 101.

When a new node 103 hears a wireless advertisement from any device in the network 101 (e.g., step 305), the node 103 can join by sending a packet to either network manager 107 (e.g., step 307). In fact, the node does not specify a particular manager to which the join packet should be routed; either manager is equally well equipped to join the node to the network based on the contents of the join packet. Whichever manager receives the join request generates a new unicast session key for the node 103 (e.g., step 313), clears the unicast counters for this session, and increments the join counter for this node. The joining manager is then equipped to transmit packets to and receive packets from the joining node 103 and sends the security information to the joining node 103 (e.g., step 315). The manager 107 having joined the node 103 then uses the manager-to-manager packets to synchronize the security information with the other manager (e.g., steps 319-321). Upon synchronization, the other manager clears its unicast counters for the joining node and updates the session key (e.g., step 321) and is then equipped to transmit packets to and receive packets from the joining node 103. Optionally, the other manager sends a packet downstream to the joining node 103 to activate links to its associated AP 105. Alternatively, the joining node can immediately add links to both APs 105. Any manager can temporarily buffer packets that it cannot properly decrypt while waiting for the security information from the other manager.

Because of the mesh nature of the wireless network 101, a joining node does not explicitly select the links it uses to send its join packet to a manager 107. With two disjoint managers 107, this can lead to race conditions where both managers are independently trying to generate security information for the new node, for example in cases in which the join request packet from the new node is routed to multiple managers. In order to overcome this problem, in one implementation, join packets are routed to only a single AP 105 (and hence to a single manager 107) during the joining process.

During regular network operation, the managers 107 exchange low data-rate packets to synch up their various counters, as described in relation to method 500. In general, this can happen on a periodic interval or when a counter increments by a certain threshold (e.g. a rollover). As a specific example, in the implementation described herein, the packet header carries the least significant one byte of the relevant counter, and this one byte counts up from 0 to 255. The managers only need to synchronize the higher bytes of this counter, so one manager-to-manager packet exchange is sufficient for every 256 upstream packets received or downstream packets sent.

Finally, if a manager resets and reboots, it requests all security information, including its own archived information, from the other manager, for example by performing steps of method 400. The other manager then re-archives its own information on the recovered manager, for example by performing steps of method 500. This all happens over the managers' respective APs' wireless links using the manager-to-manager packets. Since there is no guarantee that the last archiving event happened immediately prior to the manager reset, the recovered manager may skip some values on all its downstream unicast counters.

Figure 6:
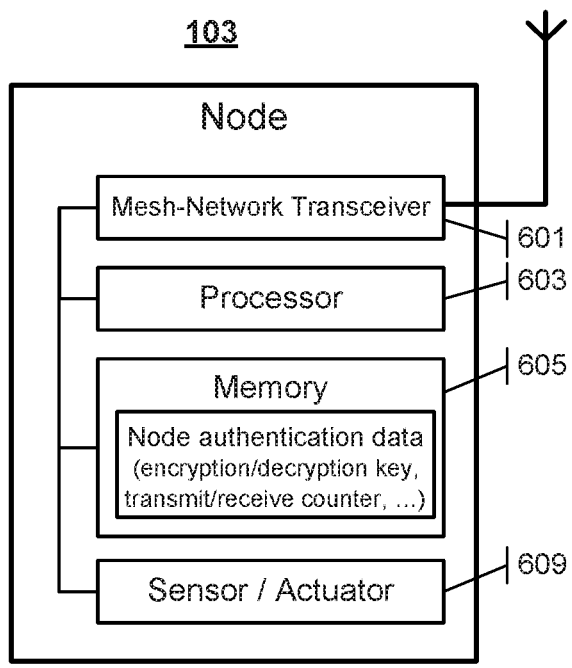
FIG. 6 is a high-level functional block diagram of an illustrative node that may be used in the network system 100 of FIG. 1, to store the authentication data of FIG. 2A, and/or in the methods of FIGS. 3A, 3B, 4, and/or 5.
Figure 7:
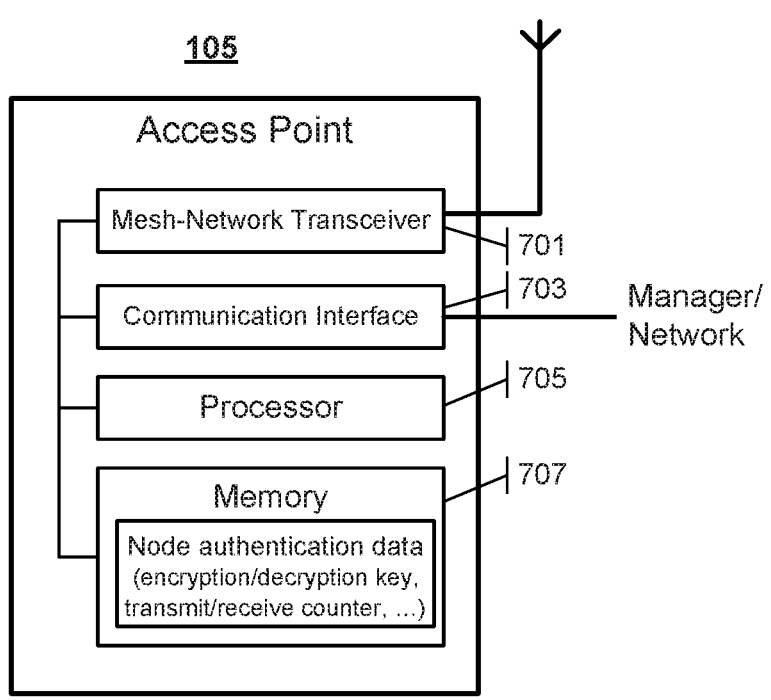
FIG. 7 is a high-level functional block diagram of an illustrative access point (AP) that may be used in the network system 100 of FIG. 1, to store the authentication data of FIG. 2A, and/or in the methods of FIGS. 3A, 3B, 4, and/or 5.
Figure 8:
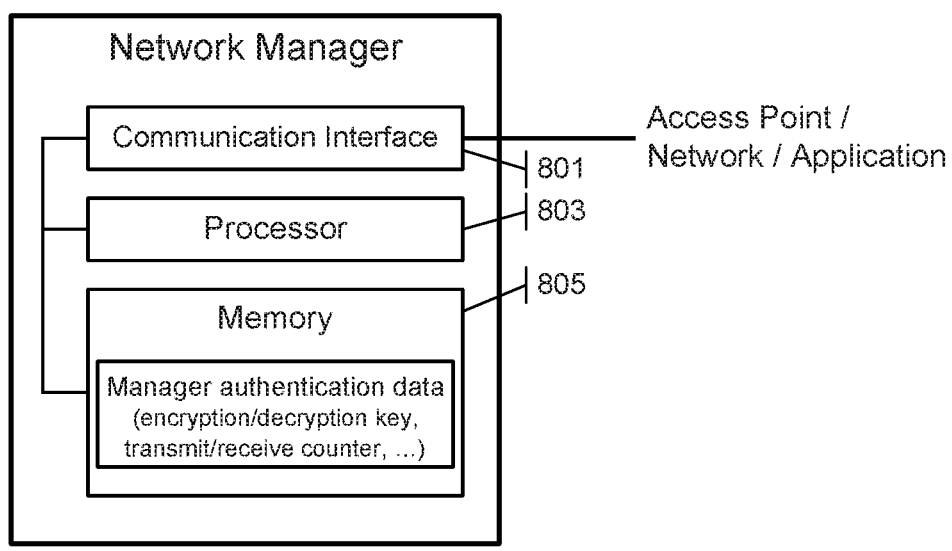
FIG. 8 is a high-level functional block diagram of an illustrative network manager that may be used in the network system 100 of FIG. 1, to store the authentication data of FIG. 2B, and/or in the methods of FIGS. 3A, 3B, 4, and/or 5.

The foregoing description has described functions performed by the various nodes 103, APs 105, and managers 107 of the wireless mesh network 101. FIGS. 6, 7, and 8, which are described in detail below, show illustrative embodiments of a node 103, an AP 105, and a network manager 107 that may be used to implement and perform the above-described functionalities.

FIG. 6 shows a high-level functional block diagram of an illustrative node 103 used in the network system 100 of FIG. 1. The node 103 includes a processor 603 (e.g., a microprocessor) and a memory 605 that provide processing capabilities. The memory 605 stores application programs and instructions for controlling operation of the node 103, and the processor 603 is configured to execute the application programs and instructions stored in the memory 605. In particular, through execution of the application programs stored in memory 605, the processor 603 may cause the node 103 to perform functions such as those described in this disclosure.

Additionally, the node 103 can include a sensor 609 producing sensing or measurement data that is provided to the processor 603 and/or stored in memory 605. The node 103 can additionally or alternatively include an actuator (e.g., a motor, valve, or the like) or other operational output (e.g., a display) that is controlled by the processor 603. The node 103 further includes a transceiver 601 that enables communication across the network (e.g., a wireless mesh-network) with other nodes 103 or APs 105. As shown in FIG. 6, the transceiver 601 is a wireless transceiver 601 connected to an antenna and configured for wireless communication; in other embodiments, the transceiver 601 may be a wired transceiver. The various components of the node 103 are communicatively connected to each other (e.g., via a bus or other communication lines).

As described in detail above, the node 103 maintains in memory 605 node authentication data that includes the various data shown in FIG. 2A. The node authentication data can include session keys used to encrypt data or packets transmitted through the network, or decrypt data or packets received through the network. The node authentication data can further include counters that are maintained by the processor 603 and are used to control against replay attacks, as shown in FIG. 2A and discussed in relation to the methods 300, 400, and 500 above. Further functions relating to the node authentication data are described in detail above.

FIG. 7 shows a high-level functional block diagram of an illustrative AP 105 used in the network system 100 of FIG. 1. The AP 105 includes components substantially similar to those of the node 103, including a mesh-network transceiver 701, a processor 705 (e.g., a microprocessor), and a memory 707. Such components of the AP 105 are substantially similar to corresponding components of the node 103, and reference can be made to the description of the node 103 for detailed information on the components and their functions. For example, the memory 707 may store application programs which, when executed by processor 705, cause the AP 105 to perform functions such as those described in this disclosure. The AP 105 optionally includes a sensor, actuator, or other operational output that is controlled by the processor 705, similarly to the node 103.

As described in detail above, the AP 105 maintains in memory 707 node authentication data that includes the various data shown in FIG. 2A. The node authentication data can include session keys used to encrypt data or packets transmitted through the network, or decrypt data or packets received through the network. The node authentication data can further include counters that are maintained by the processor 705 and are used to control against replay attacks, as shown in FIG. 2A and discussed in relation to the methods 300, 400, and 500 above. Further functions relating to the node authentication data are described in detail above.

Additionally, the AP 105 can include dual communication interfaces: a first communication interface (e.g., a mesh-network transceiver 701) configured for communication with nodes 103 of the network 101, and a second communication interface 703 (e.g., a WAN transceiver) configured for communication outside of the mesh-network such as communications with the network manager 107 or application(s) 109 (e.g., via the network manager 107). In our example, the mesh-network transceiver 701 may be a wireless transceiver, while the second communication interface 703 may be a transceiver configured for wired communications (e.g., a transceiver compatible with Ethernet standards) directly with the network manager 107 or indirectly via one or more network(s). While two communication interfaces are shown in FIG. 7, some embodiments may include a single transceiver performing both communications functions, while in other embodiments communications with the network manager 107 may be via a direct wired link.

FIG. 8 shows a high-level functional block diagram of an illustrative network manager 107 used in the network system 100 of FIG. 1. The network manager 107 controls operations of the mesh network, and serves as an interface between the network and the outside (e.g., as an interface between the network and external application(s) 109). Specifically, all communications between the mesh network and external applications 109 may flow through a network manager 107, or otherwise be controlled by a network manager 107.

The network manager 107 is shown in FIG. 1 as being a separate entity from the AP 105, and as being physically separate from any AP 105. In such embodiments, the network manager 107 and AP(s) 105 are separate entities and may be communicatively connected via a communication cable (as shown), one or more wired or wireless network(s), and/or one or more wireless communication links. In other embodiments, the network manager 107 may be co-located with one AP 105, for example within a same device casing. In such embodiments, the network manager 107 and AP 105 may have distinct processors, may be mounted on distinct circuit boards, and may be communicatively connected by wire traces between the circuit boards. In further embodiments, the network manager 107 may execute on a same processor as an AP 105.

The network manager 107 includes a processor 803 (e.g., a microprocessor) and a memory 805 that provide processing capabilities. The memory 805 stores application programs and instructions for controlling operation of the network manager 107, and the processor 803 is configured to execute the application programs and instructions stored in the memory 805 and control operation of the manager 107. In particular, through execution of the application programs stored in memory 805, the processor 803 may cause the network manager 107 to perform functions such as those described in this disclosure.

As described in detail above, the network manager 107 maintains in memory 805 manager authentication data that includes the various data shown in FIG. 2B. The manager authentication data can include join keys and session keys used to encrypt data or packets transmitted through the network, or decrypt data or packets received through the network. The node authentication data can further include counters that are maintained by the processor 803 and are used to control against replay attacks, as shown in FIG. 2B and discussed in relation to the methods 300, 400, and 500 above. Further functions relating to the manager authentication data are described in detail above.

Additionally, the network manager 107 includes a communication interface 801 such as a transceiver for communication via network(s) 111. While a single communication interface 801 is shown in FIG. 8, the network manager 107 can include multiple transceivers, for example in situations in which the network manager 107 communicates using different communications standards or protocols, or using different networks or communications links, with its associated AP 105, the application(s) 109, and/or the networks 111 or servers. For instance, a dedicated communication interface (e.g., a dedicated port) can be included for communication with the AP 105 of the mesh network 101. As shown in FIG. 8, the communication interface 801 may be a wired transceiver connected to network 111; in other embodiments, the network manager 107 includes one or more wireless transceivers connected to antennas and configured for wireless communication.

The various components of the network manager 107 are communicatively connected to each other (e.g., via a bus or other communication lines), and are electrically connected to a power source to receive operating power.

The network manager 107 provides oversight of the mesh network, and can control operation of the network. For example, the network manager 107 joins nodes to the network, sets network timing and/or sets a network communication schedule, and performs other network administration based on program instructions stored in memory 805 and executed on processor 803. In addition, as part of joining nodes and APs to the network, the network manager 107 can receive identification information from nodes 103 and AP(s) 105 and can authenticate the nodes and AP(s) based on the identification information. In some examples, the authentication is performed in concert with an authentication server by transmitting identification information to the authentication server and obtaining an authentication confirmation or an authentication denial from the server. In other examples, the authentication is performed locally by the network manager 107 based on the identification information.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for coordinating authentication between network manager devices of a wireless mesh network, the method comprising:

receiving, in a first network manager device of the wireless mesh network, a join request to join a wireless network node to the wireless mesh network via a first wireless mesh network access point of the wireless mesh network;

generating, in response to receiving the join request, authentication data to authenticate subsequent communications passing through the first network manager device between the joined wireless network node and the host application, wherein the authentication data comprises, for each node of the wireless mesh network, a count of communications sent to or received from the respective node;

storing the authentication data at the first network manager device; and transmitting, by the first network manager device, the authentication data to a second network manager device of the wireless mesh network for storage and use by the second network manager device to authenticate subsequent communications passing through the second network manager device and between the joined wireless network node and the host application.

2. The method of claim 1, wherein the authentication data comprises an encryption key associated with the wireless network node, and the first network manager device uses the encryption key to encrypt or decrypt subsequent communications passing through the first network manager device between the host application and the wireless network node.

3. The method of claim 2, wherein the encryption key is a unicast encryption key specific to the wireless network node, and the first network manager device stores a different unicast encryption key associated with each different wireless network node of the wireless mesh network.

4. The method of claim 2, wherein the encryption key is a broadcast encryption key used to encrypt broadcast packets transmitted to all wireless network nodes of the wireless mesh network.

5. The method of claim 1, wherein at least one of the subsequent communications is received from a second wireless mesh network access point of the wireless mesh network, remote from the first wireless mesh network access point, and the authentication data is wirelessly transmitted from the first network manager device to the second network manager device.

6. The method of claim 5, wherein the authentication data is transmitted via the first wireless mesh network access point, one or more wireless network nodes of the wireless mesh network, and the second wireless mesh network access point from the first network manager device to the second network manager device.

7. The method of claim 1,
wherein the method further comprises:
authenticating, by the first network manager device; a respective communication passing through the first network manager device and between a respective node and the host application based on the count of the authentication data for the respective node.

8. The method of claim 7, further comprising:
resetting, by the first network manager device, a first counter based on receiving the join request from the wireless network node seeking to join the wireless mesh network;
incrementing, following resetting of the first counter, the first counter for each packet received by the first network manager device from the wireless network node, and
transmitting, by the first network manager device, a respective increment by which the first counter has been incremented to the second network manager device for use by the second network manager device in maintaining a second counter associated with the wireless network node that is synchronized with the first counter.

9. The method of claim 8, wherein the reset and incremented first counter is an upstream counter,
the method further comprising:
setting a downstream counter associated with the wireless network node in response to receiving the join request from the wireless network node;
incrementing the downstream counter for each packet transmitted from the first network manager device to the wireless network node;
following incrementing the downstream counter, transmitting a count value of the downstream counter to the second network manager device associated with a second wireless mesh network access point; and
authenticating, in the wireless network node, a respective communication received from the first network manager device based on a count of the downstream counter included in the respective communication.

10. The method of claim 1, further comprising:
receiving, by the first network manager device via the first wireless mesh network access point, from a new network manager device seeking to join the wireless mesh network, a join request to join the new network manager device with the wireless mesh network;
in response to receiving the join request to join the new network manager device:
joining the new network manager device with the wireless mesh network, and
transmitting, by the first network manager device to the new network manager device, authentication data stored by the first network manager device for all wireless network nodes of the wireless mesh network.

11. A network manager device comprising:
a communication interface for establishing a communication link, via a first wireless mesh network access point, with a wireless mesh network;
a processor communicatively connected to the communication interface; and
a non-transitory memory device storing program instructions which, when executed by the processor, cause the network manager device to:
receive, via the first wireless mesh network access point, a join request to join the wireless network node with the wireless mesh network;
generate, in response to receiving the join request, authentication data to authenticate subsequent communications passing through the network manager device between the joined wireless network node and a host application external to the wireless mesh network, wherein the authentication data comprises, for each node of the wireless mesh network, a count of communications sent to or received from the node;
store the authentication data at the network manager device; and
transmit the authentication data to another network manager device of the wireless mesh network for storage and use by the other network manager device to authenticate subsequent communications passing through the other network manager device and between the joined wireless network node and the host application.

12. The network manager device of claim 11, wherein the authentication data comprises an encryption key associated with the wireless network node, and the network manager device is configured to use the encryption key to encrypt or decrypt subsequent communications passing through the network manager device between the host application and the wireless network node.

13. The network manager device of claim 12, wherein the encryption key is a unicast encryption key specific to the wireless network node, and the network manager device stores a different unicast encryption key associated with each different wireless network node of the wireless mesh network.

14. The network manager device of claim 12, wherein the encryption key is a broadcast encryption key used to encrypt broadcast packets transmitted to all wireless network nodes of the wireless mesh network.

15. The network manager device of claim 11, wherein at least one of the subsequent communications is received from a second wireless mesh network access point of the wireless mesh network, remote from the first wireless mesh network access point, and the authentication data is wirelessly transmitted via the first wireless mesh network access point, the wireless mesh network, and the second wireless mesh network access point from the network manager device to the other network manager device.

16. The network manager device of claim 11,
wherein the program instructions, when executed by the processor, further cause the network manager device to:
authenticate a respective communication passing through the network manager device and between a respective node and the host application based on the count of the authentication data for the respective node.

17. The network manager device of claim 16, wherein the the program instructions, when executed by the processor, further cause the network manager device to:
reset a first counter based on receiving the join request from the wireless network node seeking to join the wireless mesh network;
increment, following resetting of the first counter, the first counter for each packet received by the network manager device from the wireless network node; and
transmit a respective increment by which the first counter has been incremented to the other network manager device for use by the other network manager device in maintaining a second counter associated with the wireless network node that is synchronized with the first counter.

18. The network manager device of claim 17, wherein the reset and incremented first counter is an upstream counter, and
the program instructions, when executed by the processor, further cause the network manager device to:
set a downstream counter associated with the wireless network node in response to receiving the join request from the wireless network node;
increment the downstream counter for each packet transmitted from the network manager device to the wireless network node;

following incrementing the downstream counter, transmit a count value of the downstream counter to the other network manager device associated with the other wireless mesh network access point; and including a current count value of the downstream counter in a respective communication transmitted to the wireless network node, for use by the wireless network node in authenticating the respective communication from the network manager device.

19. The network manager device of claim 11, wherein program instructions, when executed by the processor, further cause the network manager device to:

receive, via the first wireless mesh network access point, from a new network manager device seeking to join the wireless mesh network, a join request to join the new network manager device with the wireless mesh network;

in response to receiving the join request to join the new network manager device:

join the new network manager device with the wireless mesh network, and transmit, to the new network manager device, authentication data stored by the network manager device for all wireless network nodes of the wireless mesh network.

20. A wireless mesh network system comprising a first network manager device configured to coordinate authentication with a second network manager device of the wireless mesh network system, comprising:

a plurality of wireless network nodes in wireless communication with each other to form a wireless mesh network;

a first wireless access point configured to provide a communication link between the first network manager and the plurality of wireless network nodes; and the first network manager device associated with the first wireless access point and configured to relay communications between the plurality of wireless network nodes and a host application executed by a host device external to the wireless network nodes, wherein the first network manager device is configured to generate an encryption key associated with a respective node of the plurality of wireless network nodes, and transmit a decryption key associated with the respective node to the second network manager device for decrypting communications from the respective node to the host device, and wherein each respective node of the plurality of wireless network nodes is configured to transmit encrypted packets to the host device based on the encryption key associated with the respective node, the encrypted packets being routed to the host device executing the host application through one of the first wireless access point of the first network manager device and a second wireless access point of the second network manager device and decrypted by the one of the first and second wireless access points based on the decryption key associated with the respective node, and wherein upon a memory of the first network manager device storing the decryption key being cleared, the first network manager device retrieves, from the second network manager device, decryption keys corresponding to each of the encryption keys specific to nodes of the plurality of wireless network nodes.

21. The wireless mesh network system of claim 20, wherein the first network manager device transmits the decryption key associated with the respective node to the second network manager device using wireless communication between the first and second network manager devices and through the first and second wireless access points.

22. The wireless mesh network system of claim 20, further comprising:

a second wireless access point configured to provide a communication link between the second network manager and the plurality of wireless network nodes; and the second network manager device associated with the second wireless access point and that relays communications between the plurality of wireless network nodes and the host application executed by the host device external to the wireless network nodes, wherein each of the first and second network manager devices maintains a unicast counter for each node of the plurality of wireless network nodes, and in response to receiving, in the first network manager device, a packet transmitted by a particular node of the plurality of wireless network nodes, the first network manager device increments the unicast counter for the particular node maintained by the first network manager device and causes the second network manager device to increment the unicast counter for the particular node maintained by the second network manager device.

23. The wireless mesh network system of claim 22, wherein upon a memory of the first network manager device storing a unicast counter for one node of the plurality of wireless network nodes being cleared, the first network manager device retrieves, from the second network manager device, a unicast counter value of the unicast counter for the one node maintained by the second network manager device.

* * * * *